United States Patent [19]

Byrnes

[11] 4,056,281

[45] Nov. 1, 1977

[54] DISPOSABLE BACK SEAT HEADREST COVER

[75] Inventor: Leo A. Byrnes, Bloomfield Hills, Mich.

[73] Assignee: Acme Mills Company, Detroit, Mich.

[21] Appl. No.: 746,530

[22] Filed: Dec. 1, 1976

[51] Int. Cl.² .......................... A47C 7/62; A47C 31/10
[52] U.S. Cl. ....................................... 297/220; 24/204
[58] Field of Search ......... 297/220, 221, 222, DIG. 6; 24/204

[56] References Cited

U.S. PATENT DOCUMENTS

| 3,318,632 | 5/1967 | Struble et al. | 297/220 |
| 3,804,458 | 4/1974 | Jannoni | 297/220 |
| 3,916,447 | 11/1975 | Thompson | 297/220 X |

Primary Examiner—Francis K. Zugel

[57] ABSTRACT

A disposable back seat headrest cover made substantially of relatively inexpensive non-woven materials suitable for a one-time use and adapted to be removably secured to an attachment strip mounted upon and affixed to the back seat fabric in the area where normally a person sitting in the seat would place his head at rest. Both the cover and means affixed to the cover for removable engagement with the attachment strip are preferably made of non-woven fabric materials, the engagement means being in the form of a narrow strip of fibrous material and having a substantially firm yet flexible texture, substantially impregnable and impervious yet capable of engaging the attachment strip fixedly mounted upon the headrest of the seat.

6 Claims, 4 Drawing Figures

DISPOSABLE BACK SEAT HEADREST COVER

BRIEF SUMMARY OF THE INVENTION

The invention pertains to a disposable back seat headrest cover made of a relatively inexpensive non-woven sheet material having secured thereto along one edge a relatively narrow strip (by comparison with the length of the headrest cover sheet) of a relatively firm yet flexible, substantially impervious and impregnable, fibrous non-woven material having a substantial engagement characteristic in conjunctive attachment to and by a Velcro strip of male hook elements. The degree of attachment to such Velcro strip by the cover of this invention appears to be substantially greater than the attachment characteristic of other disposable back seat headrest covers of which the applicant is aware and has knowledge. Since, as does not infrequently occur, headrest covers are disengaged from their attachment to the headrest-mounted Velcro strip, it is a matter of concern from a hygienic standpoint that the degree of attachment of the headrest cover be substantial and effective, with a minimum of disengagement under normal circumstances and use.

The headrest cover is fabricated from a sheet of non-woven textile-type, relatively thin sheet material with an attachment strip of olefin, non-woven, fibrous fabric material along one edge of the cover sheet, in laminated form by suitable means such as a hot melt adhesive, sewing, heat-sealing, or other suitable processing. The headrest cover is generally about 12 inches square and the attachment strip secured and laminated thereto is generally about 1 inch wide, extending substantially across the full width of the cover. The Velcro strip secured to and mounted upon the headrest of the seat by sewing or other suitable means is generally about 1 inch wide by several inches in length but usually less than the full width of the headrest cover.

PRIOR ART CONSTRUCTIONS

Numerous means have been utilized in the past in the construction of removable headrest covers for use on common carrier transportation vehicle seat back rests. Among these are Struble et al. U.S. Pat. No. 3,063,749 issued Nov. 13, 1962, Struble et al. U.S. Pat. No. 3,113,803 issued Dec. 10, 1963, and Struble et al. U.S. Pat. No. 3,318,632 issued May 9, 1967, each for a "Head Rest Cover". The latter prior art reference disclosed a headrest cover formed of an inexpensive yet relatively durable sheet material such as a soft, felted unglazed paper or a non-woven fabric to which was attached a strip of another non-woven fabric formed of either a natural or synthetic material and including ribbed raised pile portions having a cross-sectional depth sufficient to ensnare the male hook elements of a Velcro strip. The raised pile portions were fashioned in the form of raised or looped ribs with their fibers disposed in a longitudinal attitude, an orientation substantially at right angles to the orientation of the Velcro hook elements or barbs, so that when the hooks were pressed into the ribs and passed between generally unbroken fibers, the hooks would then engage these fibers from behind and within the looped area of the fibers to effect the attachment required for the headrest cover.

The instant invention differs significantly from the concept and construction of this reference in that the fibrous attachment strip secured to the cover sheet is substantially flat and thin, substantially impervious and impregnable to the barbs or hook elements as the cover sheet is applied to the Velcro strip. The fibers of the attachment strip are arranged in a disordered, disoriented attitude, and attachment is effected by the barbs engaging the fibers in any direction on only one side of the strip.

A significant limitation of the Struble U.S. Pat. No. 3,318,632 construction, which is not present with the instant invention, is the progressive loading of the Velcro strip with soft fibers torn from the looped ribs when the cover is removed therefrom, causing subsequent attachment of new covers to be less positive.

DRAWINGS

Various further and more specific objects, features and advantages of the invention will appear from the description given below, taken in connection with the accompanying drawings, illustrating by way of example a preferred form of the invention. Reference is here made to the drawings annexed hereto and forming an integral part of this specification, in which FIG. 1 is a perspective view of a seat headrest with a cover therefor embodying the invention.

DETAILED DESCRIPTION

Figure 1:
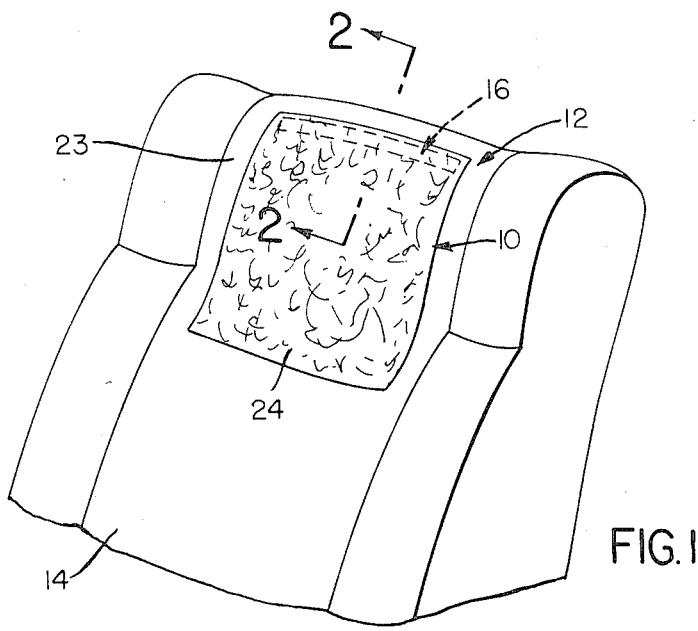
Figure 2:
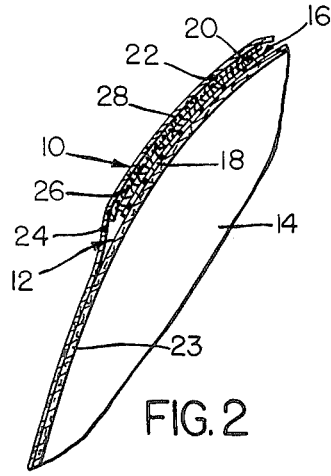
FIG. 2 is a vertical transverse sectional view, somewhat enlarged, taken substantially on the line 2—2 of FIG. 1.
Figure 3:
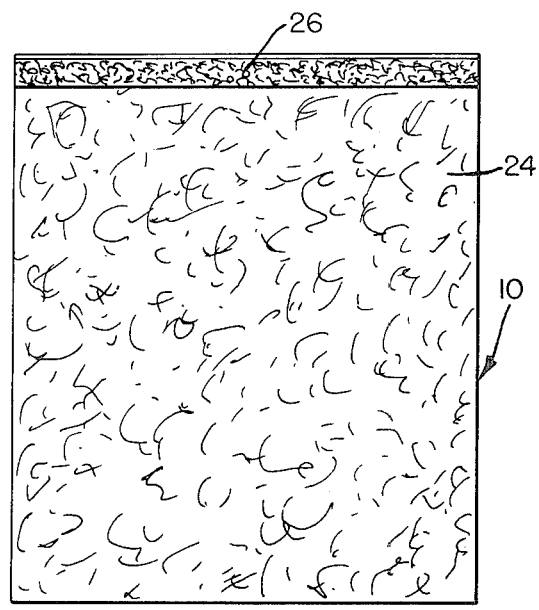
FIG. 3 is an elevational view taken on the reverse side of the cover sheet illustrated in FIG. 1, showing the disorientation of the random fibers of the attachment strip.
Figure 4:
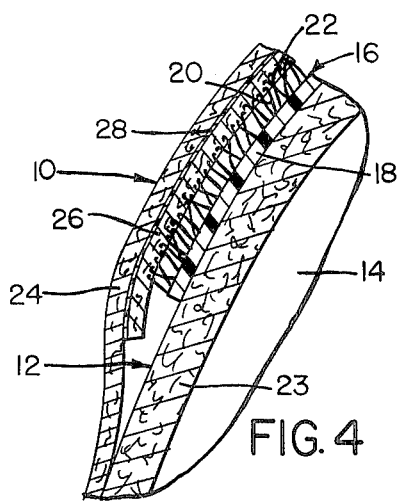
FIG. 4 is a fragmentary enlarged vertical sectional view, similar to FIG. 2, showing the relative heights or thicknesses of the Velcro strip and its male hook elements and that of the attachment strip laminated and secured to the headrest cover.

As shown in the several views of the drawings, a preferred embodiment of the invention is the headrest cover 10 which is removably secured to the headrest portion 12 of the seat back portion 14.

A Velcro strip 16 or its equivalent, comprising essentially a base layer 18 from which project a plurality of male hook elements 20 having a hook or barb 22 at the ends thereof, from one side of and substantially normal to the plane of the base layer, is securely affixed to the fabric or covering 23 of the seat headrest portion 12 by sewing, an adhesive, or by any other suitable means.

The headrest cover 10 comprises a flat thin sheet 24 of paper, woven fabric or non-woven fabric material suitable for use as a headrest cover on the headrest portions of common carrier transportation vehicle seats. Fixedly secured to and substantially across the width and adjacent an edge of the cover sheet 24 is a relatively narrow flat thin strip 26 of attachment material comprising an olefin, fibrous material that is substantially impregnable and impervious to the barbs 22 of the Velcro strip 16, substantially firm and strong yet flexible, and has its fibers in an unoriented or disoriented arrangement.

The fibrous attachment strip 26 above described is a product manufactured and sold by Phillips Fibers Corporation, a subsidiary division of Phillips Petroleum Company, under the trademark DUON and described as a Marvess ® olefin, a Phillips 66 fiber that is unaffected by moisture, stains, rot, mildew, chemicals, and insects. The DUON material is a non-woven fabric that does not slip, "squeak", or rustle, will not ravel, and though substantially firm and impervious to the barbs 22, has a soft textile "hand".

As illustrated in the several views of the drawing, the attachment strip 26 is laminated and secured to the cover sheet 24 by a hot melt adhesive material forming a relatively uniform conjunctive layer 28. Other means for conjunctively securing the strip 26 to the sheet 24 may also be used, including sewing, stapling, or other suitable adhesive materials.

The narrow flat thin strip of attachment material 26 of olefin fibers is in the form of a non-woven single layer fabric made from a mass of needled and garnetted polypropylene fibers bonded together by the application of heat (flame or hot calendar rolls) to one side of the mass producing a single sheet or layer of flexible, felt-like material, of relatively moderate tensile strength sufficient to removably secure the cover sheet 24 by applying moderate manual pressure to the cover sheet in the area of the attachment strip 26 and thereabove for engagement with the Velcro strip 16. The heated or bonded side of the attachment strip 26 is secured by the hot melt adhesive 28 to the underside of the cover sheet 24, the exposed facing side of the attachment strip 26 presenting disoriented, disordered fibers freely extending from the strip in random attitude.

The disposable back seat headrest cover 10 is removably attached to the Velcro strip 16 by pressing the attachment strip 26 firmly upon the hook elements 22 of the Velcro strip until engagement is effected. It is believed that because the hook elements attach themselves to the fibers of strip 26 in a disoriented, disordered, un-uniform arrangement, the level of engagement of the cover 10 to the Velcro strip 16 is substantially increased. Disengagement is effected by the application of force in grasping the cover sheet and pulling the attachment strip 26 from the hook elements or barbs 22.

Although the means fixedly secured to and mounted upon the seat headrest has been described above as a Velcro strip of material, it will of course be clearly understood by persons skilled in the art to which the invention pertains that other similar or equivalent materials may also be used as the support for and to which the headrest cover of this invention is removably attached.

Although a particular embodiment of the invention has been disclosed herein for purposes of explanation, further modifications or variations thereof, after study of this specification, will or may become apparent to those skilled in the art to which the invention pertains. Reference should be had to the appended claims in determining the scope of the invention.

I claim:

1. In a disposable back seat headrest cover for removable attachment to and engagement with a strip of material having a plurality of male hook elements or barbs projecting outwardly from a base layer fixedly secured to and mounted upon the headrest portion of a seat back, the improvement comprising a substantially flat thin headrest cover sheet, a substantially flat thin narrow strip of a non-woven olefin, fibrous, firm yet flexible, single layer of material, which is substantially impregnable and impervious to said hook elements, fixedly secured to said cover sheet along and adjacent one edge thereof, said flat narrow strip of non-woven olefin material comprising a mass in a single layer of needled and garnetted polypropylene fibers, bonded together by the application of heat to one side of said mass to form a single sheet or layer of non-woven, flexible, felt-like material of moderate tensile strength sufficient to removably secure said cover sheet by moderate manual pressure to said strip of material upon said male hook elements or barbs projecting outwardly from said base layer, said strip of fibers being bonded together on one side thereof into a substantially impregnable and impervious surface, and being arranged on its opposite facing surface with a mass of substantially disordered, disoriented, randomly and freely extending fibers, said fibers on the exposed side of said cover sheet strip making substantial and removable engagement with said hook elements to secure said headrest cover to the headrest portion of said seat back.

2. The headrest cover improvement defined in claim 1, wherein said cover sheet is made of a non-woven material, paper or a woven material.

3. The headrest cover improvement defined in claim 2, wherein said cover sheet attached strip and said cover sheet are secured together by an adhesive material.

4. The headrest cover improvement defined in claim 2, wherein said cover sheet attached strip and said cover sheet are secured together by staples.

5. The headrest cover improvement defined in claim 2, wherein said cover sheet attached strip and said cover sheet are secured together by sewing.

6. A disposable back seat headrest cover and a strip of material having a plurality of male hook elements or barbs projecting outwardly from a base layer fixedly secured to and mounted upon the headrest portion of a seat back, in combination, the improvement comprising a substantially flat thin headrest cover sheet, a substantially flat thin narrow strip of a non-woven olefin, fibrous, firm yet flexible single layer of material, which is substantially impregnable and impervious to said hook elements, fixedly secured to said cover sheet along and adjacent one edge thereof, said flat narrow strip of non-woven olefin material comprising a mass in a single layer of needled and garnetted polypropylene fibers, bonded together by the application of heat to one side of said mass to form a singlel sheet or layer of non-woven, flexible, felt-like material of moderate tensil strength sufficient to removably secure said cover sheet by moderate manual pressure to said strip of material upon said male hook elements or barbs projecting outwardly from said base layer, said strip of fibers being bonded together on one side thereof into a substantially impregnable and impervious thereof into a substantially impregnable and impervious surface, and being arranged on its opposite facing surface with a mass of substantially disordered, disoriented, randomly and freely extending fibers, said strip of material secured to said headrest portion being affixed thereto by an adhesive material or sewing, said fibers on the exposed side of said cover sheet strip making substantial and removable engagement with said hook elements to secure said headrest cover to the headrest portion of said seat back.

* * * * *